United States Patent [19]

Anthias et al.

[11] Patent Number: 4,845,644
[45] Date of Patent: Jul. 4, 1989

[54] DATA DISPLAY SYSTEM

[75] Inventors: Tefcros Anthias, Romsey; John A. Herrod; Martin W. Ricketts, both of Eastleigh, all of United Kingdom

[73] Assignee: International Business Machines Corporation, Armonk, N.Y.

[21] Appl. No.: 59,881

[22] Filed: Jun. 9, 1987

[30] Foreign Application Priority Data

Jun. 16, 1986 [GB] United Kingdom ................. 8614618

[51] Int. Cl.$^4$ ........................... G09G 1/00; G09G 1/16
[52] U.S. Cl. .................................... 364/521; 340/729; 382/44
[58] Field of Search ............................... 364/518, 521; 382/44-45; 340/721, 724, 729

[56] References Cited

U.S. PATENT DOCUMENTS

| | | | |
|---|---|---|---|
| 4,542,376 | 9/1985 | Bass et al. | 340/724 |
| 4,555,801 | 11/1985 | Miyagawa et al. | 382/44 |
| 4,651,146 | 1/1987 | Lucash et al. | 340/721 |
| 4,653,020 | 10/1987 | Cheselka et al. | 364/900 |
| 4,675,811 | 6/1987 | Kishi et al. | 364/200 |
| 4,710,767 | 12/1987 | Sciacero et al. | 340/729 |
| 4,725,830 | 2/1988 | Kawai et al. | 340/724 |

FOREIGN PATENT DOCUMENTS

0147542 5/1985 European Pat. Off. .

*Primary Examiner*—Gary V. Harkcom
*Assistant Examiner*—H. R. Herndon
*Attorney, Agent, or Firm*—Marc D. Schechter

[57] ABSTRACT

A data display system in which input-output display devices are connected to a central processor, and users select application programs that are run on the central processor. The control system of the central processor includes a display manager control system and a windowing control mechanism which allows a plurality of tasks to be performed concurrently and the results displayed in areas of a display screen. The windowing control mechanism includes, a task manager control program which runs as an application in the display manager control system and includes means to interact, via the display manager, with the operator to allow applications to be initiated, means to create tasks to control the processing of the application in such a way that the applications can be suspended or resumed according to whether the operator is ready for them, and means to identify to the display manager a coordination controller that the display manager can call to allow the task manager to suspend and resume applications. The display manager includes, means to combine data from each application and build a display representation that shows many windows into the various applications onto a single screen, and means to call the coordination controller identified by the task management application so that the task manager can suspend applications that are waiting for input and resume those applications which have input available.

10 Claims, 2 Drawing Sheets

DATA DISPLAY SYSTEM

BACKGROUND OF THE INVENTION

The invention relates to a data display system and in particular to a display management system which can (on a single display device) display data provided by more than one task without itself being dependent, on the way that the tasks (applications) are dispatched or, on the particular tasking system being used or, on the operator dialogue for initiating applications.

Windowing systems allow many tasks to be performed concurrently with the data for each task displayed in separate areas on the display. Depending on the windowing system, various features may be supported such as the ability to have overlapping windows, the use of window frames to indicate the boundaries of the window areas, as well as window manipulation functions.

Windowing is the generic name given to the technique of subdividing a display screen into (usually) rectangular areas (known as windows) so that different applications (tasks) can be concurrently executing. Each application usually displays data in one of the windows but on some such systems an application can display in more than one window.

To enable the operator to interact with the various applications the windowing system may provide facilities for manipulating the windows. Commonly provided functions include the ability to move a window, reduce or increase its size, scroll a window, in each case the object being to allow the operator to view on the limited space available on the screen the data from the various applications of most relevance to him.

On some systems the application refreshes the data whenever the window changes or is scrolled. On other systems the application does not display its data in the window itself but in a storage area of a fixed size (its presentation space) and the window system displays parts of this data in the applications window. This has the advantage that the application does not have to be involved in the windowing operations such as scrolling, which can be performed by the windowing system addressing different parts of the presentation space. One such system is described in EP-A-0 147 542.

Apart from window manipulation facilities, a windowing system can provide facilities to interact with the operator to define windows and start application control programs to use them. Having started an application it must be possible to suspend it so that the operator can interact with a different application and in general to suspend and resume any application for which the operator chooses to provide input.

The interaction with the operator so that applications can be started is itself a display interaction which can use any of the input-output features available on the display. Text, graphics and icons are examples of possible output features, while a mouse or a stylus may be used as input media (for instance, a mouse may be used to move a cross-hair cursor to point to one of a group of icons representing appreciations).

The windowing system needs some information about the applications so that during execution they can be provided with the resources needed (storage, files, parameters etc). It also needs to have enough information on the applications to avoid conflicts or deadly embraces as one application is suspended and another resumed because, in general, the appreciation will be independent of each other and therefore have taken no steps to avoid such conflicts.

Note also that the applications may have been developed in different languages or command systems which have inherently different characteristics and the flow of control between such applications may only be possible if the windowing system is aware of all the idiosyncrasies involved.

On some systems the user has to provide a profile for each application to the windowing system to overcome such problems. However, apart from creating problems for the user, it is not always possible to describe the resource requirements in this way and inevitably the window system imposes restrictions particularly in its ability to handle a new application type which is introduced after the windowing system was developed. It will be seen that some aspects of the windowing system are of general applicability whereas some are specific to the application environment, the operating system features available and the input-output features available on the display. It will also be seen that the way the windowing system interacts with the operator via these input-output features is itself analogous to the way the applications themselves interact with the operator and indeed that is desirable for the operator to be able to use common interactive mechanisms whether interactive with the application or with the windowing system itself.

Typically, a windowing system would include functions to:

1. Interact with the operator (using menus on the display) to allow applications to be initiated.
2. Create 'tasks' to control the processing of the applications in such a way that applications can be suspended or resumed according to whether operator input is available for them.
3. Combine data from each application and build a display representation that shows many 'windows' into the various applications onto a single display screen.
4. Provide interactive functions to allow the operator to select the application to be resumed and to control how the data is displayed (for instance by moving a window or reducing its size).
5. Provide means by which the different window areas are differentiated (for instance, by surrounding windows with 'frames' or by use of different background colors).
6. Resolve conflicts between resource requirements of the applications (for instance, by allocating resources according to viewing priority).

The problem solved by the invention is how functions (1) and (2) can be separated from functions (3)–(6) and how the problems that arise from this separation can be overcome.

SUMMARY OF THE INVENTION

In general terms according to the invention functions (3)–(6) are provided by a 'display manager' and functions (1) and (2) by a special application (known here as a 'task manager') which uses the display manager.

Many advantages result from the separation into task and display managers. Some are listed below.

Many task managers can be developed to use the display management function.

The display manager is not dependent on specific tasking mechanisms. The task manager can provide the tasking control either by using operating system features or by providing its own mechanisms (the latter case is called 'pseudo-tasking' in the description).

Windowing functions can be incorporated into existing non-windowing applications which in effect become task managers when they require multiple windows to be displayed.

The task manager can be tailored to specific environment or user requirements. For instance, information known about an application's requirements on storage or disk requirements can be used by the task manager accessing known repositories of such information.

Hierarchical or nested task managers can be supported.

It should be clear that in order for the display management to be independent of the task management, special interface mechanisms need to exist to allow each to fulfill its role. For instance, in some tasking systems the physical processing of the display session must take place on a single system task (in effect the display is assigned to the task) although the applications requesting the processing are executing on different task.

The display manager is referred to as D/M in the description.

In the description the following terms are used and are defined below:

Windowing environment: An environment in which many applications may be run concurrently, and in which the end user interacts with each application through a rectangular subdivision of a display device screen.

Operator window: One of these rectangular subdivisions of the screen. The size, position, and viewing priority of operator windows can be controlled by the end user (operator).

Virtual screen: The presentation space viewed through an operator window. The virtual screen may be larger than the operator window associated with it, in which case it may be scrolled in the window by the end user.

User Control: The process which controls size, position, and viewing priority of operator windows on the screen, and provides an end user dialog for this.

Task manager: The process which controls initiation, termination, and execution priority of applications running in a windowing environment, and provides an end user dialog for this. This process may use the task management facilities of the operating system, or substitute its own pseudo-tasking facilities.

According to the invention there is provided a data display system in which input-output display devices are connected to a central processor and user select application programs that are run on the central processor. The control system of the central processor includes a display manager control system and a windowing control mechanism which allows a plurality of tasks to be performed concurrently and which displays the results in areas of a display screen.

The windowing control mechanism includes a task manager control program which runs as an application in the display manager control system. The task manager includes means to interact via the display manager, with the operator to allow applications to be initiated, means to create tasks to control the processing of the application in such a way that the applications can be suspended or resumed according to whether operator is available for them, and means to identify to the display manager a coordination controller that the display manager can call to allow the task manager to suspend and resume applications.

The display manager includes means to combine data from each application and build a display representation that shows many windows into the various applications onto a single screen, and means to call the coordination controller identified by the task management application so that the task manager can suspend applications that are waiting for input and resume those application which have input available s that it can be resumed.

BRIEF OF DESCRIPTION OF THE DRAWINGS

BEST MODE OF CARRYING OUT THE INVENTION

Figure 1:
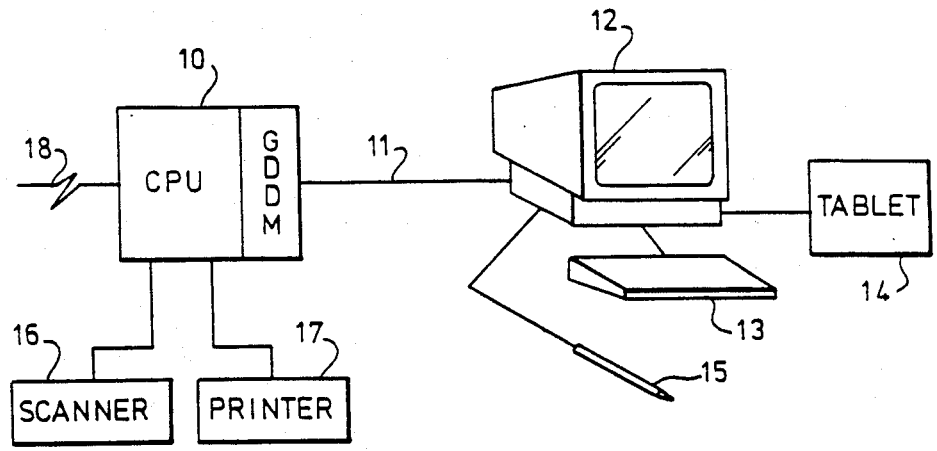
FIG. 1 illustrates the component parts of an image data display system.

Referring now to FIG. 1, there is shown a host processor 10 which is connected over a communication link 11 to a display system that includes a display device 12, and various user operated input devices such as a keyboard 13, a tablet 14, and a light pen 15. The host processor may have a direct input from a digital scanner device 16 and an output connection to a printer or plotter 17. A telecommunication link 18 provides an input and output connection to and from devices.

The display device 12, which may be an IBM 3193, includes a screen refresh buffer, a microprocessor and a control program store, usually a read only memory (ROM). The control program store includes the microcode to control the transform operations. When a transform is to be made upon the image data signals received from the host processor 10, the appropriate microcode is invoked from the control program store which then controls the microprocessor to place the image data pel definition signals, as they are received, into the required screen refresh buffer locations.

The host processor 10, contains a control system that has several different layers of operating programs, each controlling a different aspect of the machine's operation. The operating program with which the present invention is concerned controls the picture manipulation functions of the processor. An example is the IBM Graphic Data Display Manager (GDDM), (IBM is a Registered Trade Mark). GDDM is a product which provides an application interface to a large number of input and output devices such as displays, printers, plotters and scanners in the IBM 370 environment, as well as supporting the creation and editing of both graphic and image pictures.

Overview

A windowing environment is one in which many applications may be run concurrently. To support such an environment it is necessary to provide facilities for sharing all the resources of the session between the applications. D/M supports a windowing environment by providing facilities to share all the resources under D/M control between many applications using D/M concurrently. Resources not normally under control of D/M have to be managed by another process, such as the task manager or the operating system.

Briefly, D/M provides the resource sharing as follows. Each application has its own session (or sessions) of D/M. Some resources, such as a plotter, are shared serially. Other resources, such as display terminals may be shared concurrently. Concurrent sharing of a device requires that the task manager makes special use of its own session of D/M to coordinate sharing of the device by means of a coordination exit.

The resources controlled by D/M are:

D/M load modules

Each application will have its own session (or sessions) of D/M. D/M already uses operating facilities to manage sharing of D/M load modules between several sessions of D/M, so no new function is required.

D/M session storage

Each application will have its own session (or sessions) of D/M, so there will be no contention between applications for session related resources. When operating system tasking is used by the task manager no additional support is required from D/M for freeing up session storage not freed by the application. For the case when operating system tasking is not used, D/M function is provided to support freeing of D/M session storage not freed by the application.

Devices, Displays, Plotters and Printers

Display devices may be shared concurrently between several applications by means of operator windows. All other devices are shared serially.

Figure 2:
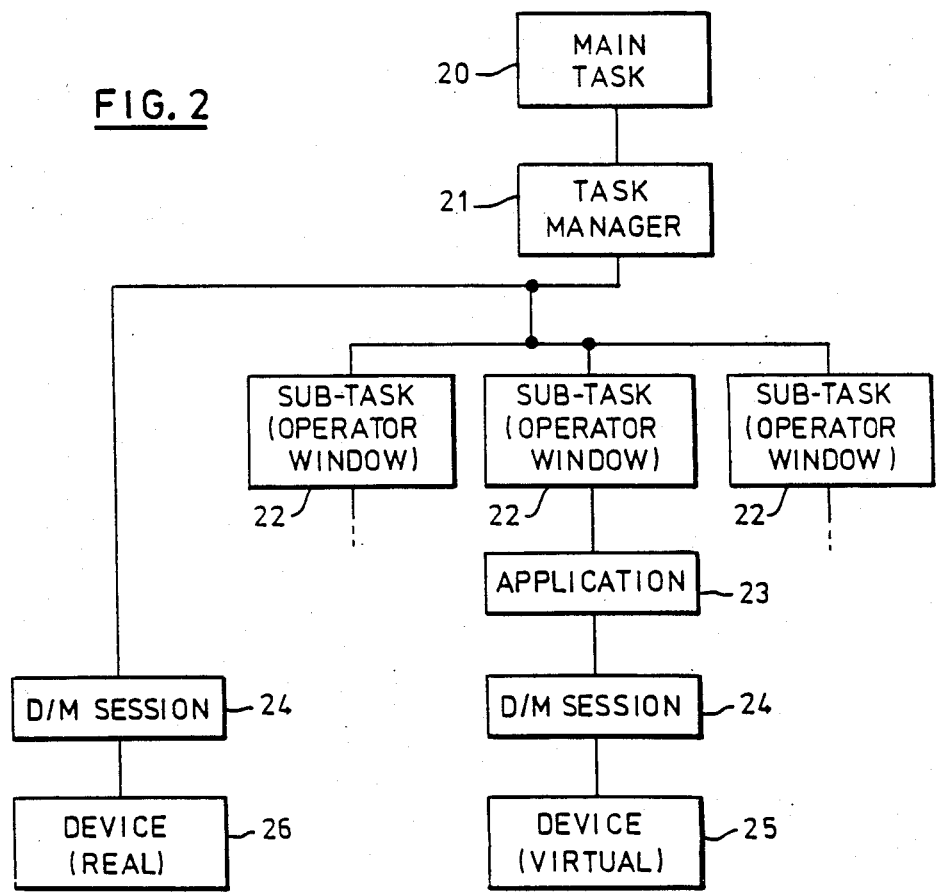
FIG. 2 illustrates a windowing environment structure.

The windowing environment structure is shown in FIG. 2.

The objects in the windowing environment structure are:
 The main task 20
 The task manager 21
 The subtask 22
 The application 23
 The D/M session 24
 The virtual device 25 and data area displayed on it The task manager 21 has a session of D/M which it uses to control the real device 26 and coordinate shared use of the device by applications 23. The task manager controls one or more subtasks 22. It associates each subtask with an operator window on the real device 26 being windowed.

Running in each subtask is an application 23. (It is possible for applications to call other applications, but this is not significant to the hierarchy.) Each application may use one or more sessions of D/M 24, and each session of D/M may open the device being windowed. The devices opened by these sessions of D/M are called virtual devices 25.

The data (presentation space) provided by the application for each virtual device is shown on the virtual screen which is displayed in the operator window associated with the subtask under which it is running.

Operator windows have a virtual screen, size, position, frames or borders, and viewing priority.

The virtual screen is the presentation space which is viewed through the operator window. Its size is fixed when the operator window is created. Its size is not limited to the size of the real device being used. Using User Control functions the operator may scroll the virtual screen in the operator window.

Size may be varied from a single character position on the screen to a maximum. The maximum operator window width is the smaller of the screen width or the virtual screen width, and the maximum operator window depth is the smaller of the screen depth or and the virtual screen depth.

Position may be any point on the screen.

Frames, or borders which may have titles imbedded within them to remind the user of which application is active in the window.

As windows can be sized and positioned independently, and so may overlap, it is necessary to assign a viewing priority to each. The viewing priority is controlled by the end user. When the end user selects a particular window it becomes the current window, and is assigned highest viewing priority. This brings it to the front of all the other windows.

The windowing function provided by the D/M will now be described.

Creating operator windows.

Functions are provided by D/M to create, select, modify and delete windows. The candidate operator window is the one which will be used to window subsequent device openings.

Operator windows may be created either with or without a coordination exit.

If an operator window with a coordination exit is the candidate operator window, then if the same device is opened this, or any other, session of D/M, the newly opened device will be associated with the candidate operator window. I/O functions for the newly opened device will cause the coordination exit to be invoked.

If an operator window without a coordination exit is the candidate operator window, then if the same device is opened by this session of D/M, the newly opened device will be associated with the candidate operator window. I/O functions for the newly opened device will not cause a coordination exit to be invoked. The effect of I/O function in this case is described below. If instead, the same device is opened by any other session of D/M it will not be windowed, but will be diagnosed as an error.

The first device opened for windowing is called the "real device", and devices opened to appear in operator windows are called "virtual devices". Both real and virtual devices may be opened for windowing, in which case they are called "coordinating devices".

Opening virtual devices

One session of D/M may only open one virtual device in any particular operator window, but several D/M sessions could each open one virtual device in the same operator window. In this case, at any point in time it is the virtual device which most recently requested I/O which appears in the window.

The parent operator window

When a virtual device is opened it is associated with the candidate operator window. That window then becomes the "parent" operator window for the virtual device. The parent operator window of a device is the operator window in which the device's presentation space is displayed. When the real device is opened, a special parent operator window is implicitly created. The purpose of this parent operator window is to provide a window to display any presentation space created for the real device.

Whether associated with the real device, or with virtual devices, parent operator windows all have identifiers of zero. They can be selected and modified, but may not be deleted. When hierarchies of virtual devices are created, an operator window created by one device may be the parent operator window of another device.

Hierarchies of virtual devices

It is possible for virtual devices to be windowed. In this case there will be a real device, opened for windowing with windows defined upon it. The virtual devices associated with these windows may themselves be opened for windowing and have window defined upon them. This can happen for any number of virtual devices, and may be nested to any depth.

Hierarchies of virtual devices do not appear on the screen as windows within windows. All the windows appear to the end user as peers. This means that window coordinates must be specified in terms of real screen dimensions, not virtual screen dimensions.

Modifying and deleting operator windows

A D/M function is available to change the size and position of the operator window, to scroll the virtual screen within the operator window, and to change the operator window title. Modification of these attributes will change the appearance of the operator window at the next device I/O.

Deleting an operator window will close all the virtual devices associated with it by this session of D/M. Virtual devices belonging to other sessions of D/M will not be closed, and should be closed before the operator window is deleted. The results of subsequent operations on such a virtual device are undefined.

Virtual screens

Each operator window has associated with it a virtual screen, which is the presentation space viewed through the operator window. When an operator window is created a virtual screen size is specified and the virtual screen is also created.

Many D/M applications would work with one specific size of screen. There are sometimes problems with running such applications on devices with different screen sizes. The task manager could have a profile to be associated with every application it runs, which contains such things as intended screen size, and application name. This information can be used by the task manager to create a virtual screen of the preferred size when running such an application.

Coordination exits

The purpose of the coordination exit is to pass control between the main task and sub-tasks. It effectively synchronizes the I/O functions for a windowed device when independent applications, each with their own sessions of D/M, are all trying to use it at once.

The function supports synchronous running of independent applications. This means that between end user interactions only one application is running. At each interaction the end user may choose which application to run next by selecting the operator window associated with that application and interacting with it.

The coordination exit routine must pass control from the main task to a sub-task, or from a sub-task to the main task, depending upon its DIRECTION parameter. When control is passed to the main task, that is, the task manager, then the task manager must call the coordinated I/O function and then return control to the application associated with the operator window made current by the end user. If multi-tasking is used to control the independent applications, then the task manager must also perform the necessary task switching.

The coordinated I/O function

The coordinated I/O function (CIO) causes output and possibly input for the windowed device.

If any operator window is requesting output only, then CIO performs output but does not wait for input and returns the identifier of the operator window for which I/O was completed or its parent operator window identifier depending upon the operator window hierarchy. If more than one operator window was requesting output only the one with highest viewing priority is satisfied first. If no windows are requesting output only then CIO performs the type of I/O requested by the current (i.e. highest viewing priority) operator window and returns the identifier of the operator window for which I/O was completed, or its parent operator window identifier depending upon the operator window hierarchy. If the end user selects a new current window then the type of I/O requested by this ne current window is performed.

CIO returns the identifier of the operator window which satisfied the I/O request. If hierarchies of operator windows and virtual devices are being used and the operator window which satisfied the I/O request is at a lower level in the hierarchy than the primary device, then the identifier of its ancestor operator window belonging to this device is returned.

Figure 3:
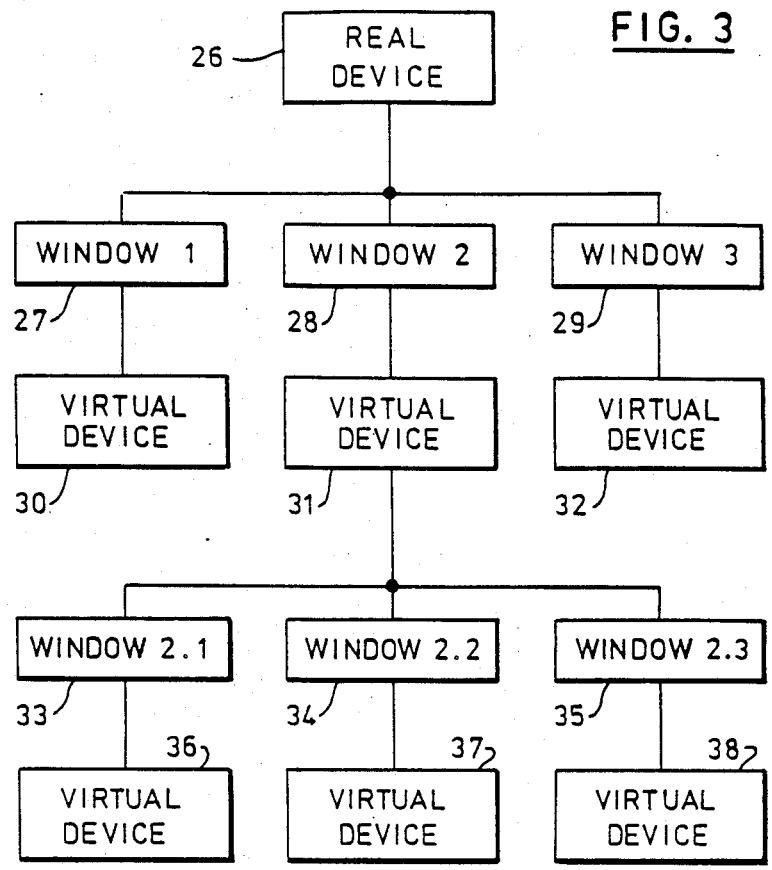
FIG. 3 illustrates the hierarchy of operator windows.

When there are hierarchies of operator windows CIO works as illustrated in FIG. 3.

FIG. 3 shows a device 26 with three windows 27, 28, 29, with identifiers 1, 2, and 3. The virtual device 31 opened in operator window 28 is further windowed, with three windows 33, 34, 35, with identifiers 1, 2, and 3. The lower level windows can be considered to have compound identifiers of 2.1, 2.2, and 2.3.

The top level of windows are created by a task manager, and the second level of windows are created by an application which is making use of multiple operator windows for its end user dialog. To perform device I/O the application calls CIO for the virtual device opened in window 28. This CIO will invoke the coordination exit which will cause the task manager to perform a CIO for the real device 26.

If the end user makes window 2.3 current and responds to the type of I/O requested, then the CIO issued by the task manager will return 2 as the identifier of the current operator window. Control will then be returned via the coordination exit to the CIO issued by the application, which will return 3 as the identifier of the current operator window.

If, in the example, the viewing priority of the windows was 1, 2, 2.1, 2.2, 2.3, and 3, and the end user selected window 2.3, then the new viewing priority is 2.3, 2, 2.1, 2.2, 1, and 3. Selecting window 2.3 makes window 2.3 the highest priority amongst windows 2, 2.1, 2.2, and 2.3, and also makes all these windows higher priority than any other windows.

Other I/O functions

When a virtual device is associated with an operator window which has a coordination exit, all I/O functions (except CIO) are allowed, and cause the coordination exit to be invoked. The coordination exit must invoke the CIO function, which in turn will perform the required I/O function on the device.

If operator windows without coordination exits are used then the effect of I/O functions is somewhat different. When a virtual device is associated with an operator window which has no coordination exit, and an I/O function is called for that device, rather than calling CIO for the coordinating device, the I/O will be performed, but the end user will not be able to use control mode to select another operator window.

Task management and windowing environment processes

This describes how a task manager could make use of D/M windowing function. If real tasking is not used, then substitute the appropriate pseudo-tasking actions.

Initialization

To support concurrent sharing of a display device the task manager will initialize a session of D/M and open the device for windowing. This action designates this session of D/M as the coordinator for concurrent shared use of the device.

If there is no coordinator for a device then the device will be shared serially between sessions of D/M. Each session will take over the entire device when it reaches an I/O function. Only sessions of D/M which open the device when the coordinator is designated, and when an operator window has been created and the operator window is available for use, will be windowed. Instances of D/M which open the device before the coordinator is opened will take over the entire device when it reaches an I/O function. If a session of D/M attempts to open the device after the coordinator is opened, but when there is no operator window available, the open will fail and an error will be diagnosed.

Coordination exit

To coordinate use of the windowed device the task manager has to create a window for each application, of group of applications, which are to appear in a window. Each window has associated with it a coordination exit address. This exit is invoked when the application calls a D/M function which requires I/O for the windowed device.

The exit routine must post the main task and wait. The main task will call the coordinated I/O function, CIO using the coordinator session of D/M, and, depending upon the parameter returned from CIO, post the subtask and wait. The exit routine will then return control to the D/M I/O function, which eventually returns control to the application.

A parameter returned by CIO identifies the current operator window, and must be used to determine which subtask to post.

The first application

The task manager starts the "master application". The master application is a special application which is part of the task manager. It conducts a dialog with the end user to determine which application to run next. It is run as part of the task manager task.

The task manager starts the master application by:

Creating the first operator window. This operator window does not have a coordination exit as the master application is a part of the task manager and uses the same session of D/M. Calling the master application.

The master application opens a virtual device to run in the operator window, and builds the appropriate data to conduct a dialog with the end user to determine which application to run next.

Further applications

To start another application the end user makes the master application operator window current, and selects the application to be run. The master application will:

Create a new operator window. This operator window will have a coordination exit as the application is independent, and not a part of the task manager.

Attach a new subtask and set the new application running by waiting on application requests or completion.

Application processing

Each independent application will use its own session of D/M. When the application calls a D/M function which requires I/O for a virtual device the coordination exit will be used to pass control to the task manager. This will invoke the coordinated I/O function, CIO, and "eventually" the task manager will return control to the application.

During a coordinated I/O where all applications are requesting input the operator may use User Control to change the size and position of the operator windows, scroll the virtual screens within the windows, and select other operator windows. When the end user selects an applications operator window, and interacts with it by pressing an interaction key then control will be returned to the task manager, which in return would be expected to return control via the coordination exit to the application. The D/M I/O function used will the return the appropriate parameters to the application just as if it had not been windowed.

Terminating applications

Typically applications may be terminated by the end user instructing the application to terminate, an action which is application specific, or by the application terminating abnormally. In either case control is returned to the task manager, which calls D/M to delete the operator window. If there are no more applications active then this is the cue for the task manager to terminate, otherwise the task manager must call CIO for the end user to control what happens next.

Coordination exit interface

By providing a coordination exit when creating an operator window a task manager permits the use of that window by independent applications running their own sessions of D/M.

A task manager specifies a coordination exit when creating a window.

Parameters required

The parameters for coordination exits are as follows. This is a suggested parameter list for a particular implementation and other interfaces are possible provided they allow the exit access to information required for resumption or suspension of the executing tasks o pseudo-tasks.

Exit Token

This is a value that was specified by the task manager when the window was created. It could for instance be the address of an anchor block containing control data for posting or waiting on subtask or maintask events.

Direction

The direction in which the exit is to pass control. Possible values are:

—pass control from the sub-session to the main-session,
1—pass control from the main-session to the sub-session.

Feedback Values

On return, the exit must set return data to indicate successful completion or Sub-task terminated abnormally.

Figure 4:
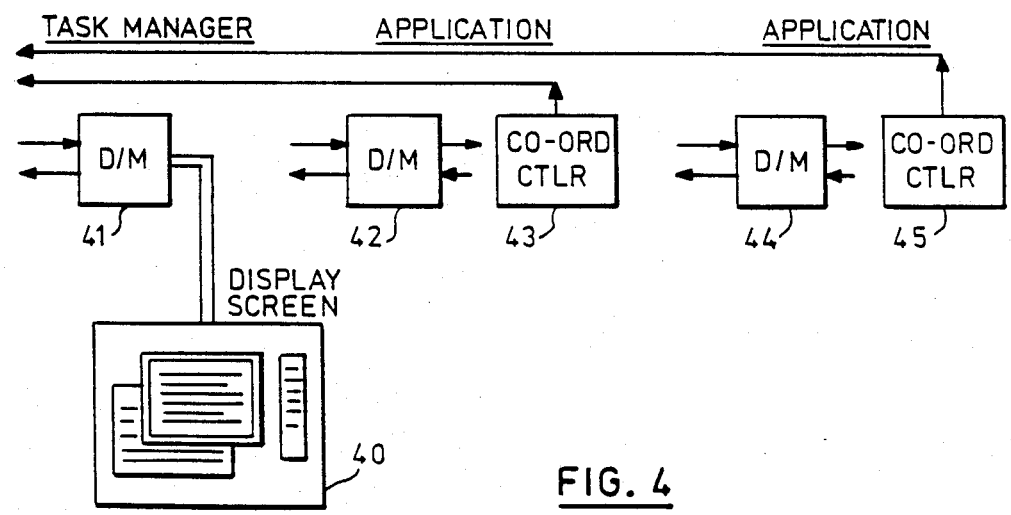
FIG. 4 illustrates the flow control between display managers.

FIG. 4 illustrates the flow of control between the task manager, and two applications. The D/M 41 directly controls the display screen 40. The flow of control between the application which has D/M 42 an coordination controller 43 and the application with D/M 44 and coordination controller 45 and D/M 41 is explained by reference to the following task manager and application flow.

| TASK MANAGER | DISPLAY MANAGER | APPLICATION |
|---|---|---|
| Open device | → Perform device | |
| | ← connection | |
| Build menu | → | |
| | ← | |
| Converse | → Transmit data | |
| | ← Read input | |
| Create window specifying coord exit | → Add window for device | |
| | ← | |
| Start appl | | Initiated |
| → Wait | → → | → |
| | | Open device |
| | | ← |
| | | Associate |

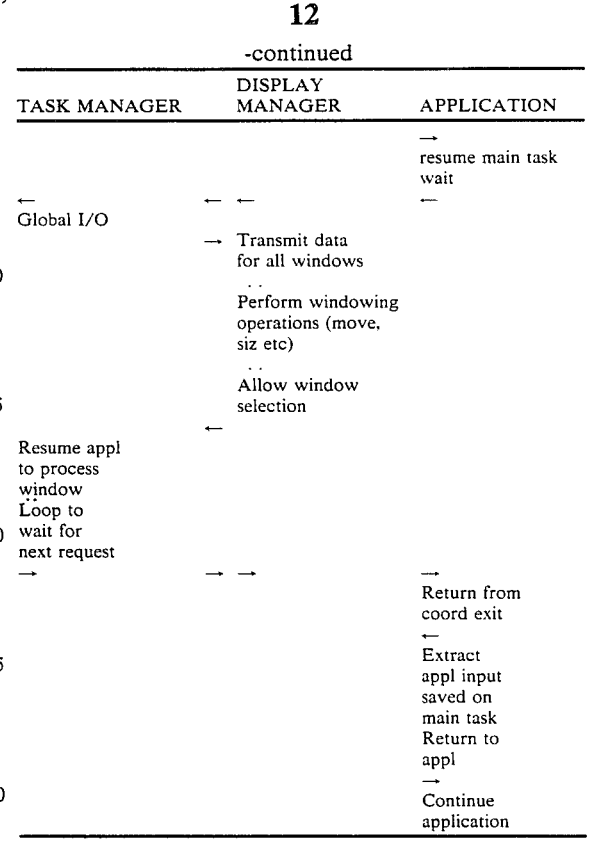

| TASK MANAGER | DISPLAY MANAGER | APPLICATION |
|---|---|---|
| | | → resume main task wait |
| | ← ← | ← |
| Global I/O | | |
| | → Transmit data for all windows | |
| | Perform windowing operations (move, siz etc) | |
| | Allow window selection | |
| | ← | |
| Resume appl to process window Loop to wait for next request | | |
| → | → → | → |
| | | Return from coord exit |
| | | ← |
| | | Extract appl input saved on main task Return to appl |
| | | → |
| | | Continue application |

When more than one application is running as a sub-application of another then the flow of control for the supported window is illustrated by the following:

| TASK MANAGER 1 | TASK MANAGER 2 | APPLICATION 2.1 |
|---|---|---|
| Open device→D/M | | |
| ← ○ ○ | | |
| Start° other applications | | |
| Open window using CC1 | | |
| Start TM 2 | | |
| Wait . . . | Open device→D/M | |
| | ← ○ ○ | |
| | Start application 2.1 | |
| | Wait . . . | Open device→D/M |
| | ○ | ← ○ ○ |
| | ○ | Converse |
| | ○ | →D/M→CC2 |
| | ○ | ←Post TM2 |
| | (wait satisfied) | |
| | Request | |
| | Coordinated I/O | →D/M→CC1 |
| (wait satisfied)← | ← | ←Post TM1 |
| | | Wait |
| Request | | |
| Coordinated I/O→ | D/M→Display Screen | |
| TM2id returned← | | |
| Post TM2 | | |
| Return to Wait status | | wait satisfied |
| | | Appl 2.1id returned through D/M |
| | | Return to wait status |
| | | Wait satis through D/M input data returned |
| | | Continue Appl 2.1 | device with window
→
. . .
← Converse call exit
→ coord exit

While the invention has been described with reference to a system in which the D/M (GDDM) is run on a central processor supporting a plurality of display devices it is not necessarily limited to that environment. The processor which is controlled by the display manager may be resident in the physical display device and the functions carried out in the device.

Having thus described our invention, what we claim as new, and desire to secure by Letters Patent is:

1. A data display system comprising:
    a display device;
    a host processor for processing applications;
    a task manager control system for initiating the processing of applications on the host processor in response to an operator, said task manager also controlling the processing of multiple applications on the processor, said processing control including suspending the processing of applications waiting for input when no input is available, said processing control including resuming the processing of suspended applications when input becomes available, each application having an associated operator window;
    a display manager control system for displaying multiple operator windows on the display device, one of the displayed operator windows being a current window, the remaining operator windows being subordinate windows; and
    a coordination controller for identifying the current and subordinate windows, said coordination controller signaling the task manager control system to suspend the processing of an application waiting for input when the application is associated with a subordinate window, said coordination controller signaling the task manager control system to process an application waiting for input when the application is associated with the current window.

2. A system as claimed in claim 1, in which application programs are given access to a virtual display device interface and applications have full use of a display device and in which the applications have no requirement to be aware of the presence of a task manager or the windowing environment.

3. A system as claimed in claim 2, in which the display manager provides functions for the operator to manipulate the windows on the display.

4. A data display system as claimed in claim 1, in which input-output display devices are connected to a CPU and users select application programs that are run on the CPU and including a windowing control system which allows a plurality of tasks to be performed concurrently and the results displayed in areas of a display screen,
    wherein the windowing control system includes a window manager which interacts with the operator to allow applications to be initiated,
    create tasks to control the processing of the application in such a way that the applications can be suspended or resumed according to whether operator is available for them,
    and further wherein an application which the window manager controls may itself be a window manager which itself performs the application and tasking control functions described above.

5. A system as claimed in claim 4, in which a window manager which controls another window manager as an application need have no awareness of whether an application is a window manager or not or have any awareness of window created by the hierarchically dependent window manager and where conversely the dependent window manager need have no awareness that it is being controlled by another window manager.

6. A data display system as claimed in claim 5, and in which more than one window area displayed on a display screen may overlap.

7. A data display system as claimed in claim 1, wherein:
    the coordination controller signals the task manager control system to process an application waiting to produce output to the associated operator window but not waiting for input, whether the application is associated with a current window or a subordinate window; and
    when output is produced to an operator window, the coordination controller signals the display manager to update the operator windows displayed on the display device.

8. A data display system as claimed in claim 7, wherein the coordination controller identifies the operator windows so that any application can write information to any operator window.

9. A method of operating a data display system comprising a display device and a host processor for processing applications, said method comprising the steps of:
    managing the processing of multiple applications by initiating the processing of applications on the host processor in response to an operator, suspending the processing of applications waiting for input when no input is available, and resuming the processing of suspended applications when input becomes available, each applications having an associated operator window;
    displaying multiple operator windows on the display device, one of the displayed operator windows being a current window, the remaining operator windows being subordinate windows; and
    coordinating control of the managing of the processing of the multiple applications by identifying the current and subordinate windows, signaling the task manager control system to suspend the processing of an application waiting for input when the application is associated with a subordinate window, and signaling the task manager control system to process an application waiting for input when the application is associated with the current window.

10. A method of operating a data display system in which input-output display devices are connected to a central processor and user select application programs that are run on the central processor and including in the control system of the central processor a display manager control system and a windowing control mechanism which allows a plurality of tasks to be performed concurrently and the results displayed in areas of a display screen, said method comprising the steps of:
    running a task manager control program which functions as an application in the display manager control system and includes the steps of;
    interacting via the display manager, with the operator to allow applications to be initiated,
    creating tasks to control the processing of the application in such a way that the applications can be suspended or resumed according to whether operator input is available for them,
    identifying to the display manager a coordination controller that the display manager calls to allow the task manager to suspend and resume applications, combining data from each application and building a display representation that shows many windows into the various applications onto a single screen and, calling the coordination controller identified by the task management application so that the task manager can suspend applications that are waiting for input and resume those applications which have input available so that it can be resumed.

* * * * *